United States Patent
Kurahashi et al.

(10) Patent No.: US 7,440,064 B2
(45) Date of Patent: Oct. 21, 2008

(54) LIQUID CRYSTAL DISPLAY DEVICE

(75) Inventors: Nagatoshi Kurahashi, Mobara (JP); Kaori Miyazaki, Mobara (JP); Masahiro Ishii, Mobara (JP); Masahiko Suzuki, Mobara (JP); Yoshiyuki Umeda, Hitachi (JP)

(73) Assignee: Hitachi Displays, Ltd., Mobara-shi (JP)

( * ) Notice: Subject to any disclaimer, the term of this patent is extended or adjusted under 35 U.S.C. 154(b) by 0 days.

(21) Appl. No.: 11/507,568

(22) Filed: Aug. 22, 2006

(65) Prior Publication Data

US 2006/0279686 A1 Dec. 14, 2006

Related U.S. Application Data

(62) Division of application No. 10/756,606, filed on Jan. 14, 2004, now Pat. No. 7,098,982.

(30) Foreign Application Priority Data

Jan. 15, 2003 (JP) ............................. 2003-006939

(51) Int. Cl.
*G02F 1/1343* (2006.01)

(52) U.S. Cl. ........................................ 349/141; 349/39
(58) Field of Classification Search ...................... None
See application file for complete search history.

(56) References Cited

U.S. PATENT DOCUMENTS

2002/0159016 A1 10/2002 Nishida

*Primary Examiner*—David C. Nelms
*Assistant Examiner*—Lucy P Chien
(74) *Attorney, Agent, or Firm*—Antonelli, Terry, Stout & Kraus, LLP.

(57) ABSTRACT

In a liquid crystal display device, in each unit pixel which is formed as a region surrounded by scanning signal lines and date signal lines includes pixel electrode to which signals of the date signal line is electrically supplied through a thin film transistor and common electrode which are electrically connected with the common signal line, and common signal electrode is arranged to be superposed on the common signal line by way of an insulation layer, and the pixel electrode is electrically connected with a source electrode of the thin film transistor via a through hole which penetrates the insulation layer, and the common electrode is formed such that the common electrode extend in the inside of the unit pixel while covering the common signal line.

5 Claims, 15 Drawing Sheets

LIQUID CRYSTAL DISPLAY DEVICE

CROSS REFERENCE TO RELATED APPLICATION

This application is a divisional application of U.S. application Ser. No. 10/756,606, filed Jan. 14, 2004 now U.S. Pat. No. 7,098,982, the contents of which are incorporated herein by reference.

BACKGROUND OF THE INVENTION

The present invention relates to a liquid crystal display device in which a technique is employed for suppressing the generation of undesired electric fields that can be the cause of image retention, which tends to degrade the image quality of the display device.

In a liquid crystal display device, a liquid crystal layer formed of liquid crystal molecules is sandwiched between two sheets of insulating substrates, preferably made of glass, and, at the same time, at least a pair of electrodes for applying an electric field to the liquid crystal layer are provided to either one or both of the substrates. In an IPS (in-plane switching) type of liquid crystal display device, all of the above-mentioned electrodes for applying an electric field to the liquid crystal layer are formed on one substrate, and the pixels are turned on and off (that is, switching is effected) so as to selectively form an electric field having components that are parallel to the substrate surface with respect to the liquid crystal layer in selected pixels.

SUMMARY OF THE INVENTION

FIGS. 14A and 14B are diagrammatic views of the vicinity of one pixel of a liquid crystal display device in which an IPS method is employed, wherein FIG. 14A is a plan view and FIG. 14B is a cross sectional view take along a line A-A' in FIG. 14A. To an inner surface of one substrate (first substrate, usually referred to as the thin film transistor substrate, since it constitutes a substrate on which thin film transistors are formed, as will be explained hereinafter) SUB1 of a pair of substrates which constitute the liquid crystal display device, the following pixel structure is provided. Then, a second substrate SUB2 (not shown in the drawing) on which color filters and the like are formed is laminated to the first substrate SUB1, and a liquid crystal layer is sandwiched and sealed in a gap defined between both substrates.

On an inner surface of one pixel (also referred to as a unit pixel hereinafter), a plurality of scanning signal lines GL extend in the first direction (referred to as X direction hereinafter) and are arranged in parallel in the second direction (referred to as Y direction hereinafter) which intersects the X direction; a plurality of date signal lines DL extend in the Y direction and are arranged in parallel in the X direction; common signal lines (also referred to as common storage lines) CL are disposed close to the scanning signal lines GL and extend in the X direction, while being arranged in parallel in the Y direction; a plurality of thin film transistors TFT are arranged at intersecting portions of the scanning signal lines GL and the date signal lines DL; pixel electrodes PX are driven by the thin film transistors TFT; and common electrodes CT are connected to the common signal line CL and are alternately arranged with respect to the pixel electrodes PX such that the common electrode CT is arranged close to the pixel electrode PX in the X direction. Thus, unit pixels are formed in regions which are surrounded by the scanning signal lines GL and the data signal lines DL.

As shown in FIG. 14B, which shows a cross section taken along a line A-A' in FIG. 14A, the common signal line CL is formed on the first substrate SUB1, and a data signal line DL and a source electrode SD of the thin film transistor TFT are formed on the common signal line CL by way of a gate insulation layer GI. These electrodes or wiring are covered with a laminated film which is constituted of an inorganic insulation layer PAS and an organic insulation layer OPAS, and the pixel electrodes PX and the common electrodes CT are formed on the laminated film. Although an orientation film which is brought into contact with a liquid crystal layer (not shown in the drawing) is formed over the pixel electrodes PX and the common electrodes CT, these elements are omitted from the drawing.

The pixel electrodes PX and the common electrodes CT are alternately arranged close to each other in a comb-teeth shape. As shown in FIG. 14B, the pixel electrodes PX are connected to the source electrode SD, which constitutes an output electrode of the thin film transistor TFT, via a through hole SH. As shown in FIG. 14A, the source electrode SD is superposed on the common signal line CL, and a portion which forms the through hole SH projects into the inside of the unit pixel region in a step-like manner. Here, the reference symbol OR in FIG. 14A of the drawing indicates the direction of orientation control performance applied to the orientation film (the so-called rubbing direction). Further, an area indicated virtually between dashed lines represents a light blocking film (a black matrix) BM, which is usually formed on the second substrate. Here, the indication of the light blocking film BM is used in respective drawings to be referred to hereinafter in the same manner.

With respect to a liquid crystal display device having such a constitution, in the periphery of the unit pixel, particularly between the common signal line CL and the pixel electrode PX, or the common electrode in the vicinity of the thin film transistor TFT, an undesired electric field is generated, and this electric field gives rise to a drawback in that liquid crystal molecules of the liquid crystal layer are switched without regard to the image data, thus generating a so-called image retention, whereby the image quality is degraded.

FIGS. 15A to 15C are diagrammatic views showing part of the structure in the vicinity of the thin film transistor TFT in FIG. 14A, wherein FIG. 15A is a plan view, FIG. 15B is a cross sectional view taken along a line B-B' in FIG. 15A, and FIG. 15C is a cross sectional view taken along a line C-C' in FIG. 15A.

Reference symbol ZN in FIG. 15A indicates a region where the image retention is liable to occur, reference symbol E in FIGS. 15B and 15C indicates an electric field which becomes a cause of the occurrence of image retention, and reference symbol Ef in FIG. 15C indicates a particularly strong electric field. That is, as shown in FIG. 15B and FIG. 15C, due to the electric field E that is generated between the common signal line CL and the pixel electrode PX, as well as due to the electric field E generated between the source electrode SD and the common electrode CT, the liquid crystal molecules of the liquid crystal layer are switched on and off in an undesirable manner. Further, the strong electric field Ef, having a large component in the direction which intersects the liquid crystal molecules, is generated between an edge of the source electrode SD and the common signal line CL, which are disposed close to each other, and, hence, a large image retention is generated. As a result, the inventors of the present invention have found that, due to switching of the liquid crystal molecules without regard to a normal switching operation of the unit pixel, irregularities are generated in the light (or reflection light), whereby the image quality may be degraded.

Accordingly, it is an object of the present invention to provide a liquid crystal display device in which the problem of image retention is further suppressed compared to the above-mentioned liquid crystal display device having the structure shown in FIG. 14, whereby an image display having a high image quality can be obtained.

To achieve such an object, the present invention adopts respective electrode structures in which an electric field between a common signal line and a pixel electrode is blocked, an electric field between a source electrode of a thin film transistor and a common electrode is blocked or an electric field between an edge of the source electrode and the common signal line is blocked.

The details of these electrode structures will become more apparent from a description of respective embodiments which represent various examples of technical concepts of the invention, in conjunction with the drawings.

DETAILED DESCRIPTION OF THE INVENTION

Hereinafter, several embodiments of the present invention will be explained in detail in conjunction with the accompanying drawings.

Figure 1A:
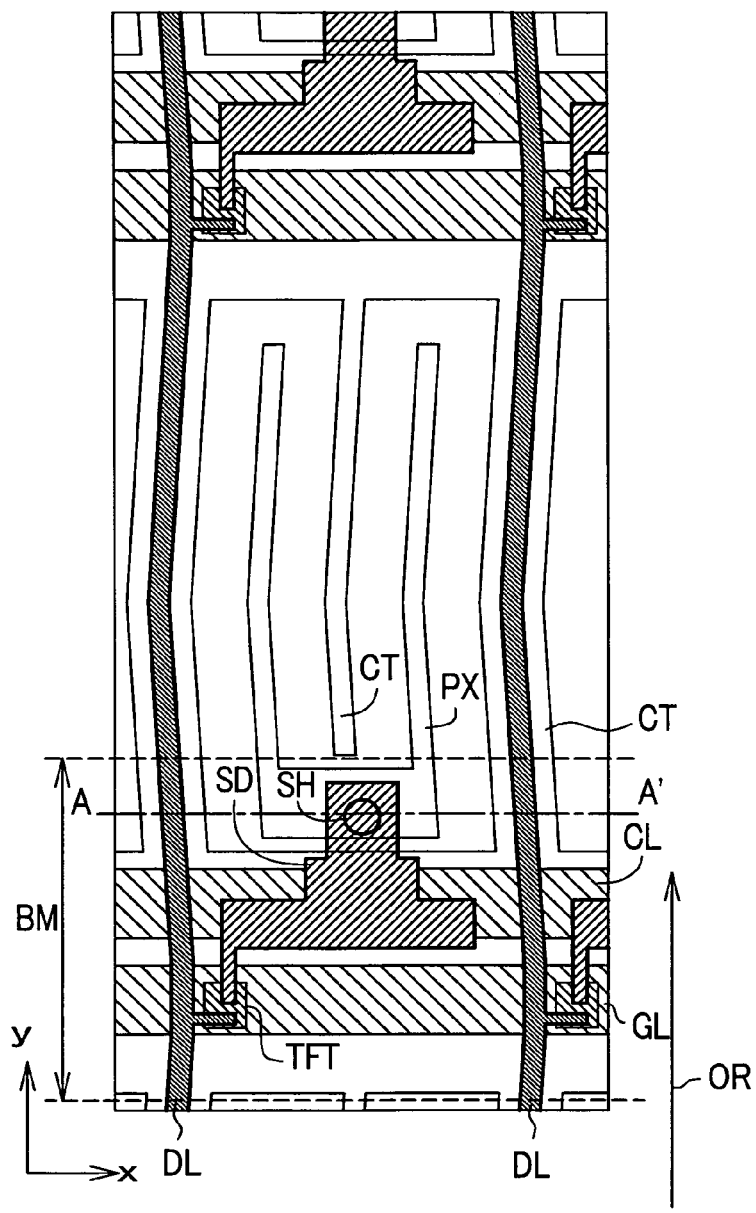
FIG. 1A is a plan view and FIG. 1B is a sectional view taken along line A-A' in FIG. 1A, showing a unit pixel representing a first embodiment of a liquid crystal display device according to the present invention.
Figure 1B:
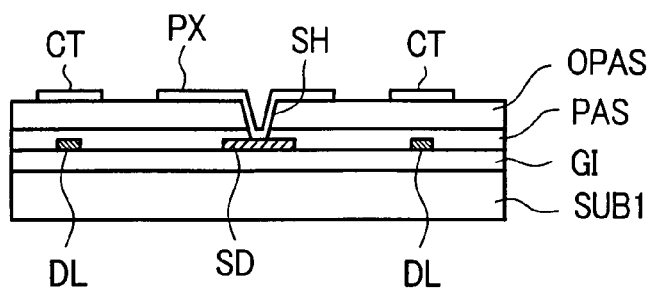
Figure 2A:
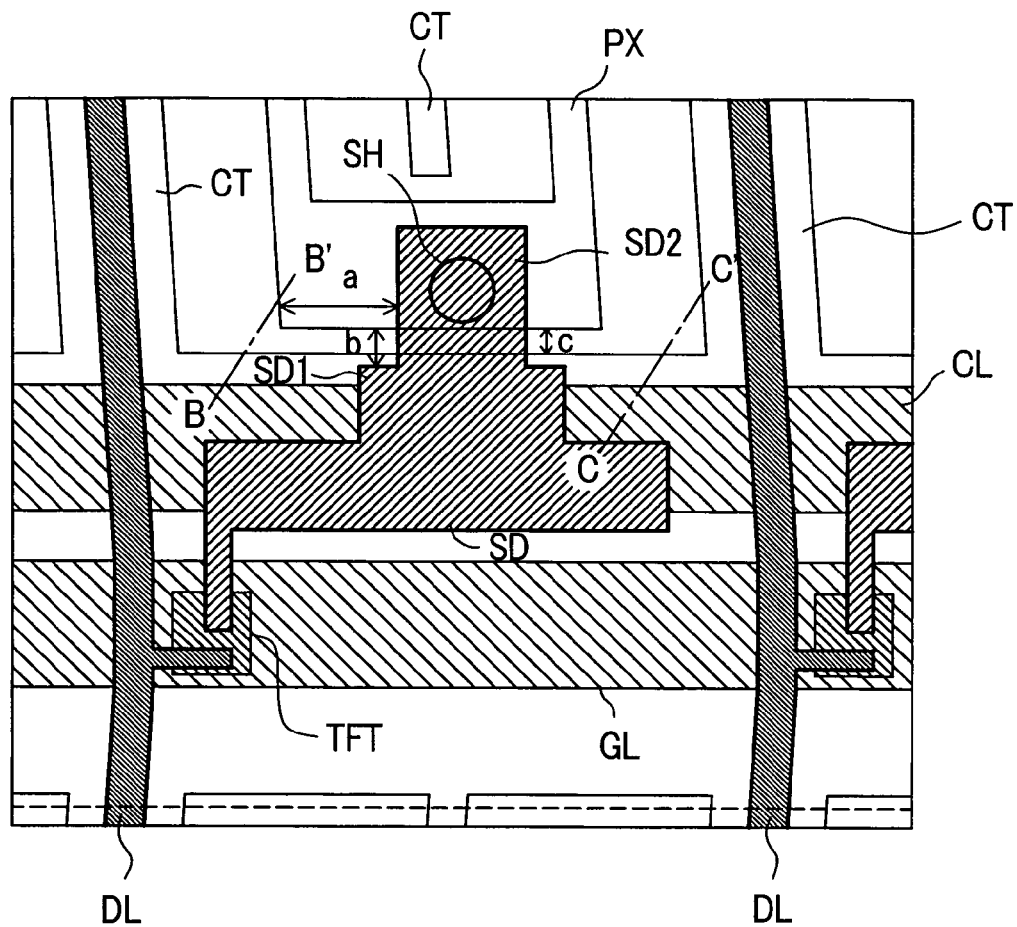
FIG. 2A is a plan view and FIGS. 2B and 2C are sectional views taken along lines B-B' and C-C', respectively, in FIG. 2A, showing the detailed structure in the vicinity of the thin film transistor TFT in FIG. 1A.
Figure 2B:
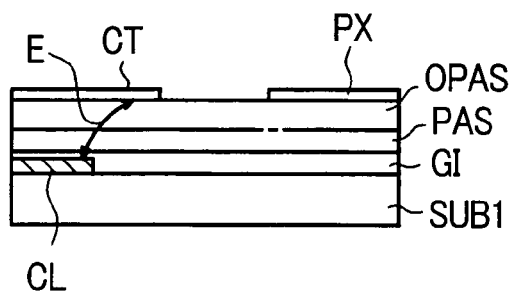
Figure 2C:
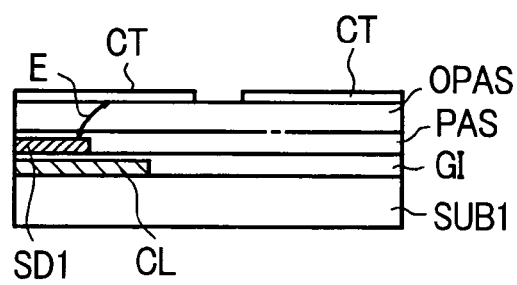

FIG. 1A shows the constitution of a unit pixel in a first embodiment of a liquid crystal display device according to the present invention, and FIG. 1B is a cross sectional view taken along a line A-A' in FIG. 1A. Further, FIG. 2A shows the detailed structure in the vicinity of the thin film transistor TFT in FIG. 1A, FIG. 2B is a cross sectional view taken along a line B-B' in FIG. 2A and FIG. 2C is a cross sectional view taken along a line C-C' in FIG. 2A. In FIG. 1A and FIG. 2A, the same reference symbols are used to identify elements correspondingly identified in the above-mentioned FIG. 14A and FIG. 15A, and, hence, a repeated explanation of such elements will be omitted. The same goes for the respective embodiments to be described hereinafter.

As seen in FIG. 1A and FIG. 2A, on an inner surface of a unit pixel which is formed on a first substrate SUB1, a plurality of scanning signal lines GL extend in the X direction and are arranged in parallel in the Y direction, which intersects the X direction; a plurality of data signal lines DL extend in the Y direction and are arranged in parallel in the X direction; common signal lines CL are disposed close to the scanning signal lines GL and extend in the X direction, while being arranged in parallel in the Y direction; a plurality of thin film transistors TFT are arranged at intersecting portions of the scanning signal lines GL and the data signal lines DL; pixel electrodes PX are provided which are driven by the thin film transistors TFT; and common electrodes CT are connected to the common signal line CL and are alternately arranged with respect to the pixel electrodes PX, such that the common electrode CT is arranged close to the pixel electrode PX in the X direction. Thus, the unit pixel is formed in a region surrounded by the scanning signal lines GL and the data signal lines DL.

The common electrodes CT are arranged in a superposed manner over the common signal line CL by way of an insulation layer, which is constituted of an inorganic insulation layer PAS and an organic insulation layer OPAS that is stacked on the inorganic insulation layer PAS. The same goes for all of the respective embodiments. However, in place of the organic insulation layer OPAS, an inorganic insulation layer may be used. Also in this case, the same goes for the respective embodiments to be described hereinafter. The pixel electrode PX is connected to the source electrode SD of the thin film transistor TFT via the through hole SH, which penetrates the insulation layer that is formed of the above-mentioned inorganic insulation layer PAS and organic insulation layer OPAS. The common electrodes CT are formed such that they extend (project) into the inside of the unit pixel so as to cover the common signal line CL, whereby an electric field E between the common signal line CL and the pixel electrode PX is blocked.

The pixel electrode PX has an end portion extending toward the inside of the unit pixel from the common electrode CT, while the source electrode SD has a first projecting portion SD1 and a second projecting portion SD2 which project in a step-like manner in a direction which intersects with the extending direction of the common electrodes CT. The step-like first projecting portion SD1 (source electrode side) is arranged between the common signal line CL and the pixel electrode PX and, at the same time, at a position which is sealed or blocked by the common electrode CT. Further, the step-like second projecting portion SD2 (a portion which further projects toward the unit pixel side from the first projecting portion SD1) is connected to the pixel electrode PX via the through hole SH at a position where the second projecting portion SD2 is superposed on the pixel electrode PX.

Further, assuming that the distance between an edge of the second projecting portion parallel to the Y direction and the pixel electrode PX neighboring in the X direction is "a", the distance between the pixel electrode PX and an end portion of the first projecting portion in the Y direction is "b", and the distance between the pixel electrode PX and the common electrode CT neighboring in the Y direction is "c", the relationships a>c and b>c are established. Further, the relationships a>c and b>c may be established. Due to the setting of such relationships, the electric field generated between the common signal line and the pixel electrode is blocked, or the electric field E generated between the source electrode SD of the thin film transistor TFT and the common electrode CT is blocked. Further, the electric field E generated between the edge of the source electrode SD and the common signal line CL is also blocked.

According to this embodiment, switching of the liquid crystal molecules without regard to the normal switching operation of the unit pixel is suppressed, and, hence, no irregularities are generated with respect to the transmitting light (or a reflection light) of the liquid crystal layer, whereby a high-quality image display can be obtained.

Figure 3A:
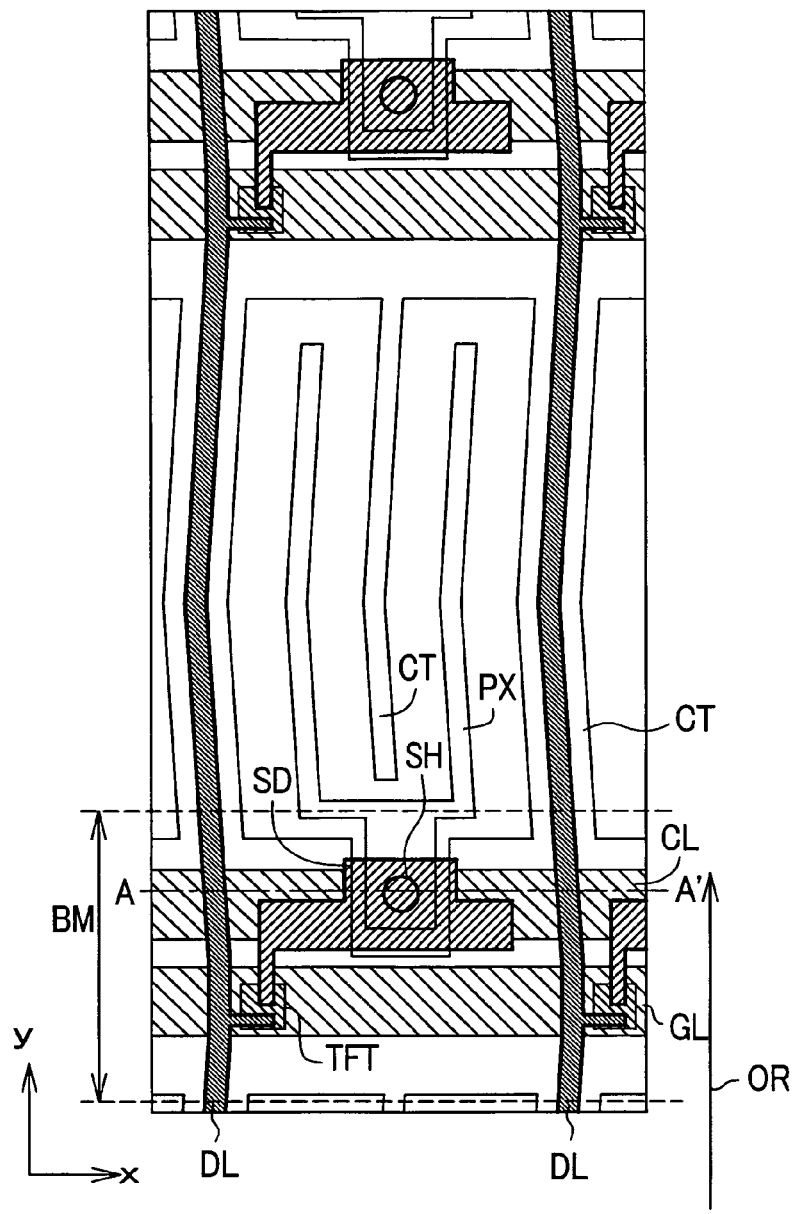
FIG. 3A is a plan view and FIG. 3B is a sectional view taken along line A-A', showing the vicinity of a unit pixel in a second embodiment of a liquid crystal display device according to the present invention.
Figure 3B:
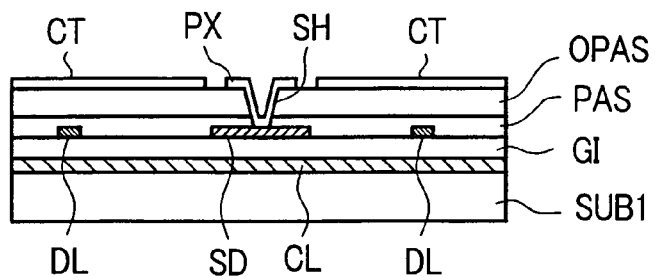

FIG. 3A shows the vicinity of a unit pixel in the second embodiment of a liquid crystal display device according to the present invention, and FIG. 3B is a cross sectional view taken along a line A-A' in FIG. 3A. Further, FIG. 4A shows the vicinity of the thin film transistor TFT in FIG. 3A, while FIG. 4B is a cross sectional view taken along a line B-B' in FIG. 4A and FIG. 4C is a cross sectional view taken along a line C-C' in FIG. 4A.

Figure 4A:
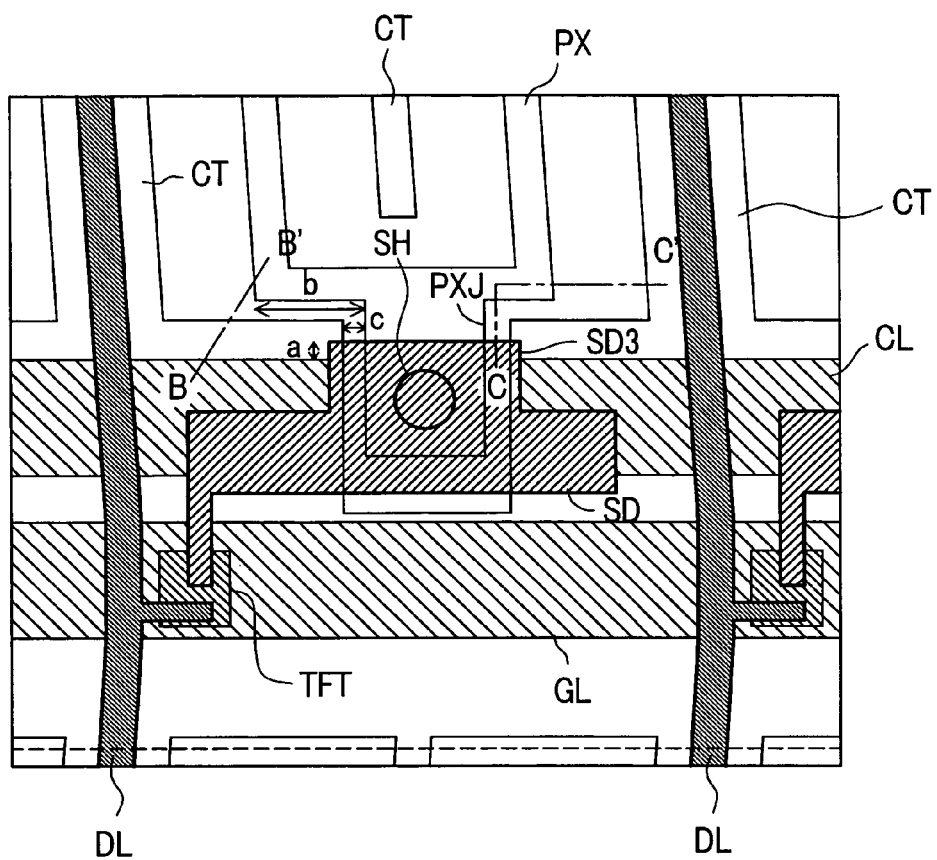
FIG. 4A is a plan view and FIGS. 4B and 4C are sectional views taken along lines B-B' and C-C', respectively, in FIG. 4A, showing the detailed structure in the vicinity of the thin film transistor TFT in FIG. 3A.
Figure 4B:
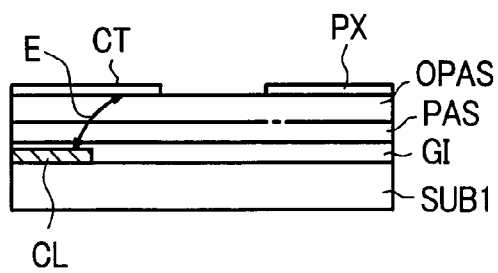
Figure 4C:
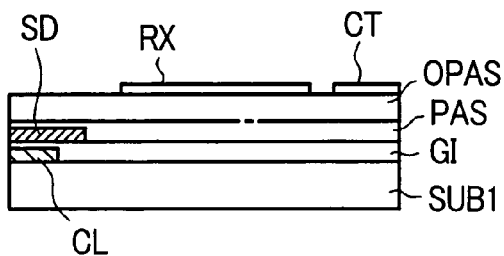

As seen in FIG. 3A and FIG. 4A, on an inner surface of the unit pixel formed on a first substrate SUB1, a plurality of scanning signal lines GL extend in the X direction and are arranged in parallel in the Y direction, which intersects the X direction; a plurality of data signal lines DL extend in the Y direction and are arranged in parallel in the X direction; common signal lines CL are disposed close to the scanning signal lines GL and extend in the X direction, while being arranged in parallel in the Y direction; a plurality of thin film transistors TFT are arranged at intersecting portions of the scanning signal lines GL and the data signal lines DL; pixel electrodes PX are provided which are driven by the thin film transistors TFT; and common electrodes CT are connected to the common signal line CL and are arranged with respect to the pixel electrodes PX such that the common electrode CT is arranged close to the pixel electrode PX in the X direction. Thus, the unit pixel is formed in a region surrounded by the scanning signal lines GL and the data signal lines DL.

The pixel electrode PX is arranged in a superposed manner over the common signal line CL by way of an insulation layer (an inorganic insulation layer PAS and an organic insulation layer OPAS) and is connected to a source electrode SD of the thin film transistor TFT via a through hole SH, which penetrates the above-mentioned insulation layer. Further, a portion of the pixel electrode PX overhangs over the common signal line CL beyond the unit pixel, and an overhanging distal end forms an extending portion PXJ, which is spaced from a side of the common signal line CL at a side opposite to the pixel is electrode. The common electrodes CT are formed such that they extend in the inside of the unit pixel covering the common signal line CL, except for a portion along the extending portion PXJ of the pixel electrode PX. Due to such a constitution, an electric field E between the common signal line CL and the pixel electrode PX can be blocked.

Further, the extending portion PXJ of the pixel electrode PX has a width that is larger than the width of the other portion of the pixel electrode PX in the X direction, and the source electrode SD has a projecting portion SD3 which projects in a step-like manner in the direction which intersects the extending direction of the common signal line CL. The step-like projecting portion SD3 is arranged between the common signal line CL and the common electrode CT and is disposed at a position which is blocked by the common electrode CT. The step-like projecting portion SD3 is arranged above the common signal line CL and at a position where the projecting portion SD3 is superposed on an extending portion PXJ of the pixel electrode PX and is connected to the pixel electrode PX via the through hole SH.

Then, assuming that the distance of the step-like projecting portion SD3 of the source electrode SD from an end portion of the common signal line CL in the Y direction is "a", the distance in the X direction of the edge in the Y direction parallel to the common signal line CL contiguous with the extending portion PXJ of the pixel electrode PX is "b", and the distance in the X direction between the edge in the Y direction of the overhanging portion PXJ of the pixel electrode PX and the common electrode CT is "c", the relationship $a \geqq 0$ is established. Further, the relationship $b \geqq c \times 2.0$ is established. Further, the relationship $a>0$ and $b>c \times 2.0$ is established. Due to the setting of such relationships, the electric field E between the common signal line CL and the pixel electrode PX is blocked, or the electric field E generated between the source electrode SD of the thin film transistor TFT and the common electrode CT is blocked. Further, the electric field E generated between the edge of the source electrode SD and the common signal line CL is also blocked.

According to this embodiment, a switching of the liquid crystal molecules without regard to the normal switching operation of the unit pixel is suppressed, and, hence, no irregularities are generated with respect to the transmitting light (or reflection light) of the liquid crystal layer, whereby a high-quality image display can be obtained.

Figure 5A:
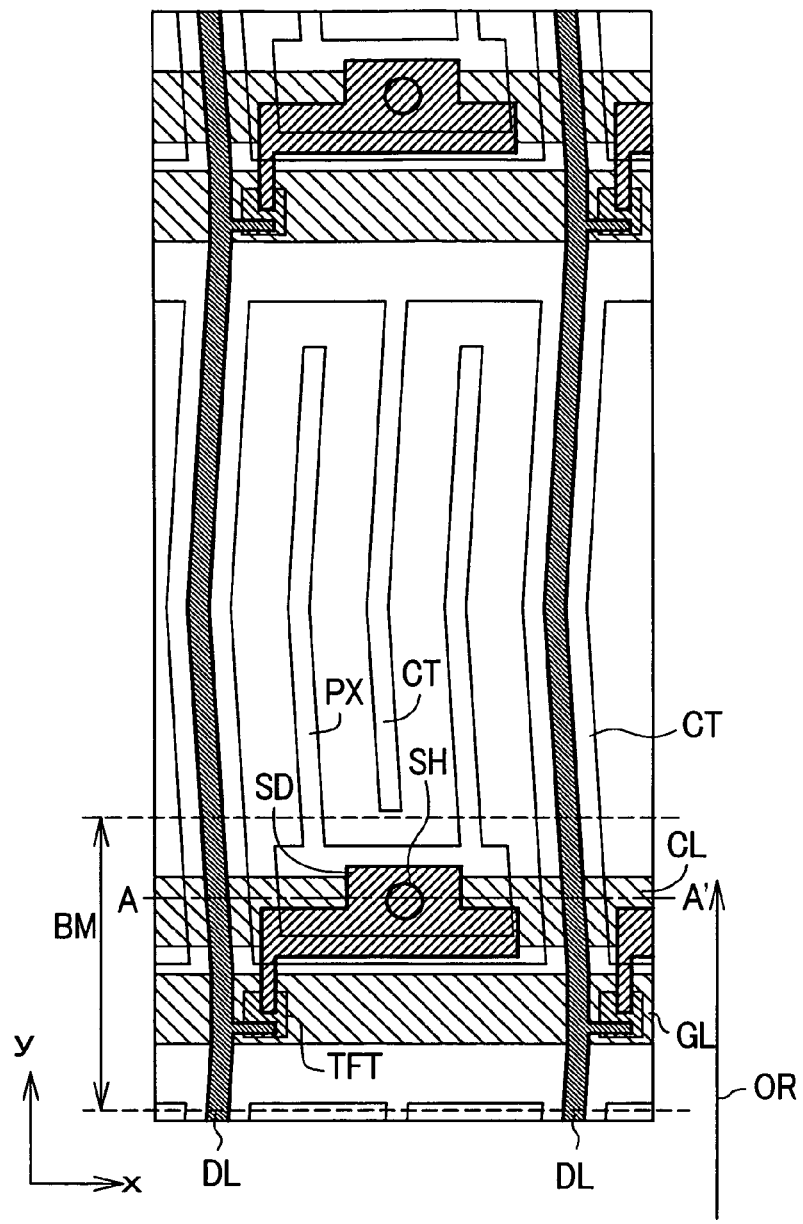
FIG. 5A is a plan view and FIG. 5B is a sectional view taken along line A-A' in FIG. 5A, showing the vicinity of a unit pixel in a third embodiment of a liquid crystal display device according to the present invention.
Figure 5B:
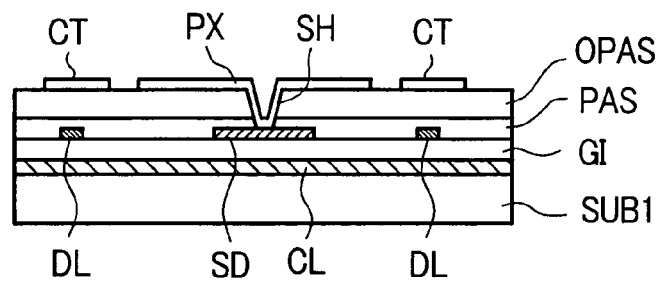

FIG. 5A shows the vicinity of a unit pixel in a third embodiment of a liquid crystal display device according to the present invention, and FIG. 5B is a cross sectional view taken along a line A-A' in FIG. 5A. Further, FIG. 6A shows the detailed structure in the vicinity of the thin film transistor TFT in FIG. 5A.

Figure 6:
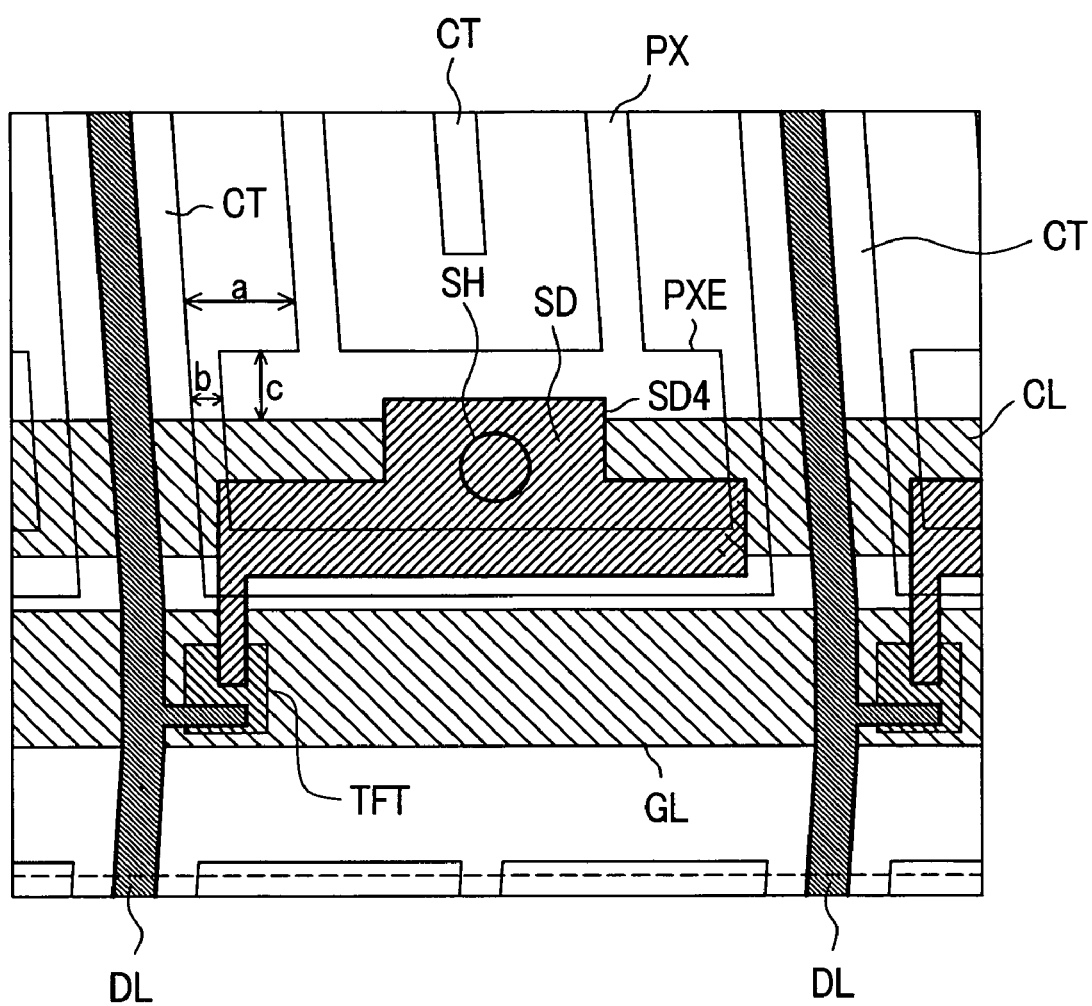
FIG. 6 is a plan view showing the detailed structure in the vicinity of the thin film transistor TFT in FIG. 5A.

As seen in FIG. 5A and FIG. 6A, on an inner surface of the unit pixel formed on a first substrate SUB1, a plurality of scanning signal lines GL extend in the X direction and are arranged in parallel in the Y direction; a plurality of data signal lines DL extend in the Y direction and are arranged in parallel in the X direction; common signal lines CL are disposed close to the scanning signal lines GL and extend in the X direction, while being arranged in parallel in the Y direction; a plurality of thin film transistors TFT are arranged at intersecting portions of the scanning signal lines GL and the data signal lines DL; pixel electrodes PX are provided, which are driven by the thin film transistors TFT; and common electrodes CT are connected to the common signal line CL and are arranged with respect to the pixel electrodes PX such that the common electrode CT is arranged close to the pixel electrode PX in the X direction. Thus, the unit pixel is formed in a region surrounded by the scanning signal lines GL and the data signal lines DL.

The pixel electrode PX is arranged in a superposed manner over the common signal line CL by way of an insulation layer (an inorganic insulation layer PAS and an organic insulation layer OPAS) and is connected to a source electrode SD of the thin film transistor TFT via a through hole SH, which penetrates the insulation layer (the inorganic insulation layer PAS and the organic insulation layer OPAS). Further, a portion of the pixel electrode PX includes an enlarged portion PXE which bridges over the common signal line CL from the inside of the unit pixel. The common electrodes CT are formed such that they extend in the inside of the unit pixel covering the common signal line CL, except for a portion along the enlarged portion PXE of the pixel electrode PX. Due to such a constitution, an electric field between the common signal line CL and the pixel electrode PX can be blocked.

The enlarged portion PXE of the pixel electrode PX has an approximately rectangular shape, having two sides along the X direction of the unit pixel and another two sides along the Y direction, wherein the unit pixel side of the two sides along the X direction extends into and is positioned in the inside of the unit pixel beyond the common signal line CL, while the side opposite to the unit pixel of the two sides along the X direction is positioned inside an edge of the common signal line CL at a side opposite to the unit pixel and outside an edge of the source electrode SD at a side opposite to the unit pixel.

Then, assuming the distance between the pixel electrode PX which extends in the Y direction from the enlarged portion PXE to the inside of the unit pixel and the common electrode CT which is arranged close to the pixel electrode PX in the X direction is "a", the distance between two sides of the enlarged portion PXE along the X direction and the common electrodes CT which are arranged close to the enlarged portion PXE is "b" and the distance between the unit pixel-PX-side out of the two sides along the X direction and the common signal line CL is "c", a relationship a>b is established or a relationship b×0.5<c is established. Further, relationship relationships a>b and b×0.5<c are established. In this manner, by enlarging the pixel electrode PX, a region which can block the common signal line CL can be enlarged, whereby the electric field E between the common signal line CL and the pixel electrode PX can be blocked, or the electric field between the source electrode SD of the thin film transistor TFT and the common electrode CT can be blocked. Further, the electric field between the edge of the source electrode SD and the common signal line CL also can be blocked.

Figure 7A:
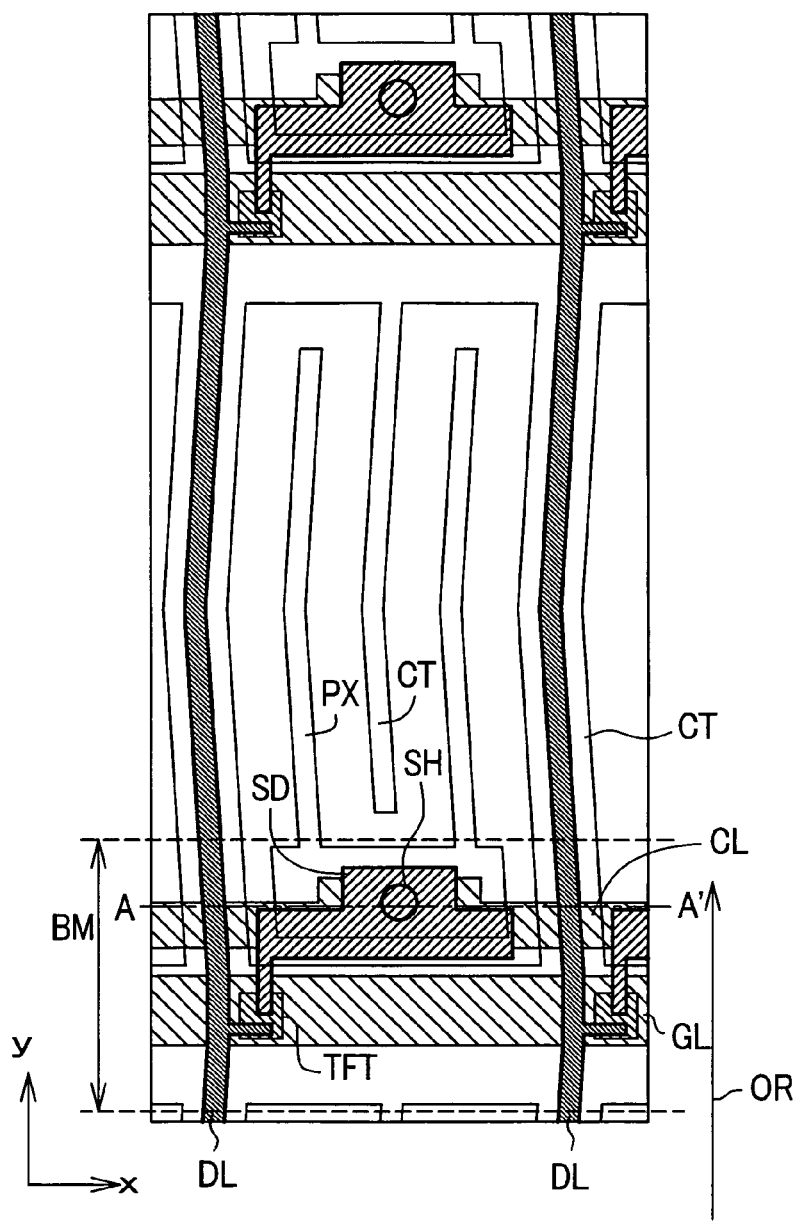
FIG. 7A is a plan view and FIG. 7B is a sectional view taken along line A-A' in FIG. 7A, showing the vicinity of a unit pixel in a fourth embodiment of a liquid crystal display device according to the present invention.
Figure 7B:
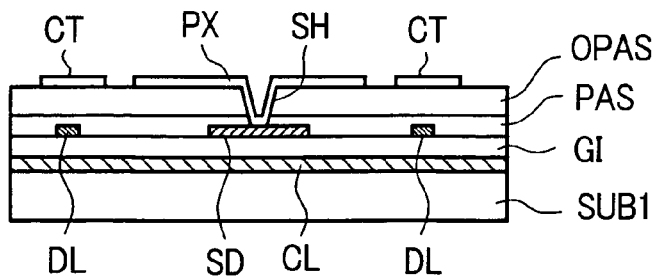
Figure 8:
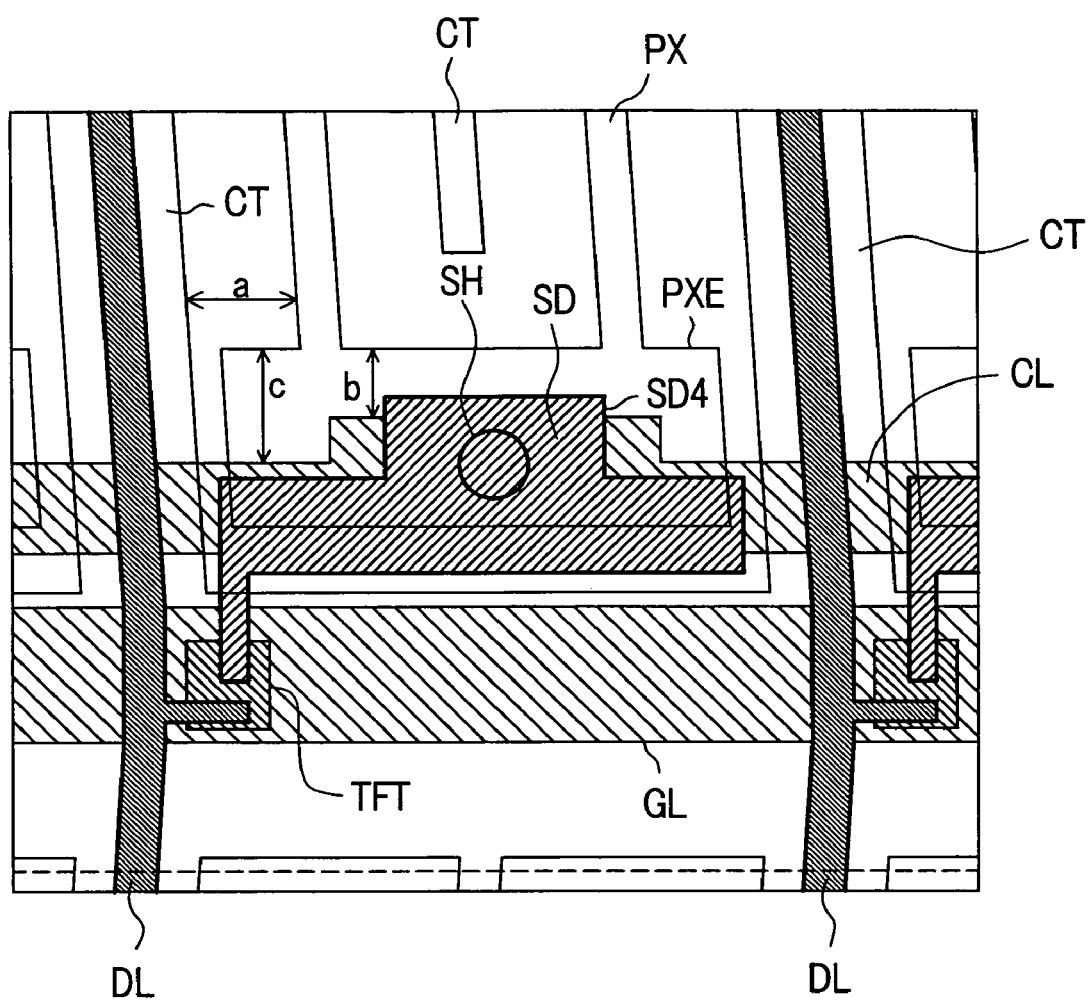
FIG. 8 is a plan view showing the detailed structure in the vicinity of the thin film transistor TFT in FIG. 7A.

FIG. 7A shows the vicinity of a unit pixel in a fourth embodiment of a liquid crystal display device according to the present invention, and FIG. 7B is a cross sectional view taken along a line A-A' in FIG. 7A. Further, FIG. 8A shows the detailed structure in the vicinity of the thin film transistor TFT in FIG. 7A.

This embodiment is characterized in that portions of the common signal line CL have the width thereof narrowed at both sides of the projecting portion SD4 of the source electrode SD as compared to the embodiment 3, wherein a unit-pixel-side edge of the common signal line CL is retracted such that the distance between the unit-pixel-side edge of the common signal line CL and the unit-pixel-side side in the X direction of the enlarged portion PXE of the pixel electrode PX is increased. That is, in the region of a portion of the source electrode SD2 which is covered with the enlarged portion PXE of the pixel electrode PX, in the X direction of the projecting portion SD4, which projects toward the unit pixel side and also projects in a step-like manner at the unit pixel side beyond the common signal line CL, a unit-pixel-side edge of the common signal line CL, which is arranged at the data signal line DL side is retracted at a side opposite to the unit pixel and the relationship of the distance a>distance b is established.

According to this embodiment, in addition to the advantageous effects of the third embodiment, a switching of the liquid crystal molecules without regard to the normal switching operation of the unit pixel can be further suppressed, and, hence, no irregularities are generated with respect to the transmitting light (or reflection light) of the liquid crystal layer, whereby a high-quality image display can be obtained.

Figure 9A:
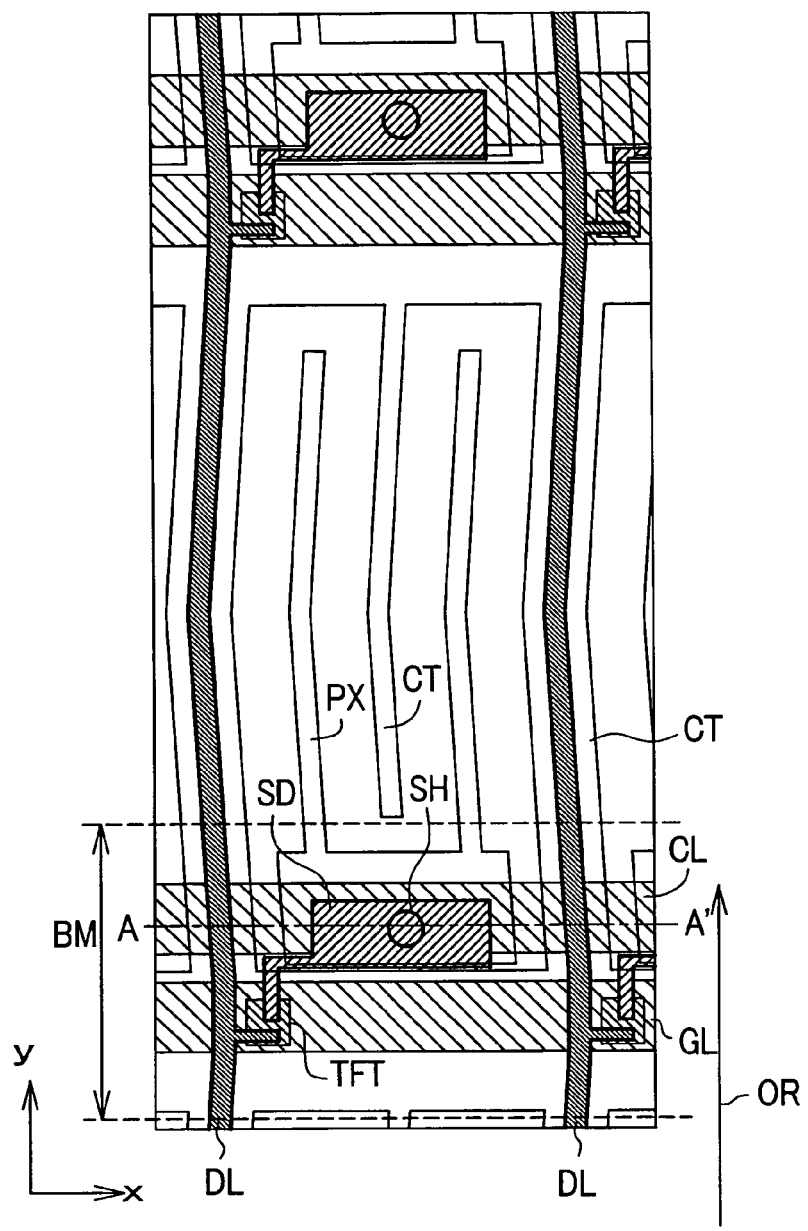
FIG. 9A is a plan view and FIG. 9B is a sectional view taken along line A-A' in FIG. 9A, showing the vicinity of a unit pixel in a fifth embodiment of a liquid crystal display device according to the present invention.
Figure 9B:
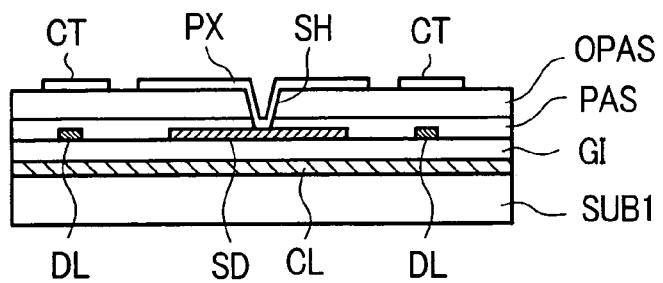

FIG. 9A shows the vicinity of a unit pixel in a fifth embodiment of a liquid crystal display device according to the present invention, and FIG. 9B is a cross sectional view taken along a line A-A' in FIG. 9A. Further, FIG. 10A shows the detailed structure in the vicinity of the thin film transistor TFT in FIG. 9A, while FIG. 10A is a plan view and FIG. 10B is a cross-sectional view taken along a line B-B' in FIG. 10A.

Figure 10A:
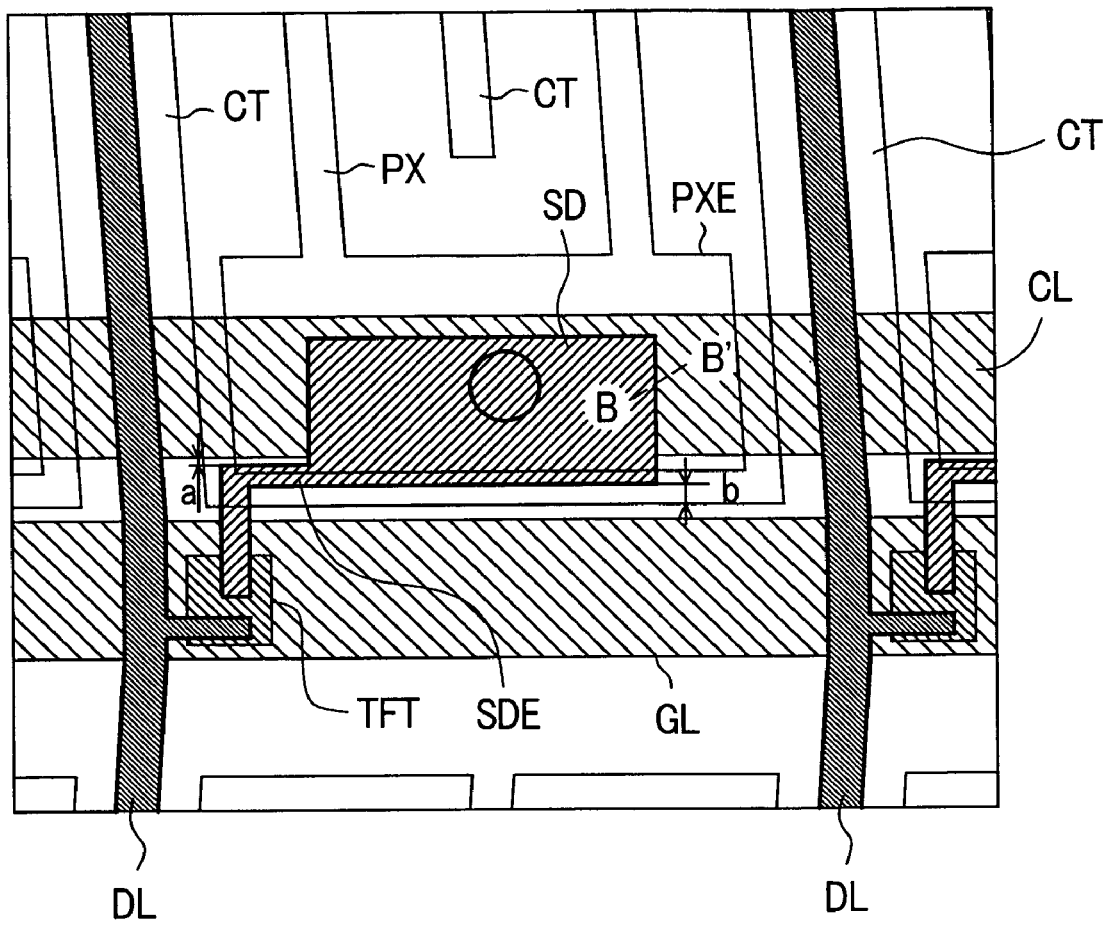
FIG. 10A is a plan view and FIG. 10B is a sectional view taken along line B-B' in FIG. 10A, showing the detailed structure in the vicinity of the thin film transistor TFT in FIG. 9A.
Figure 10B:
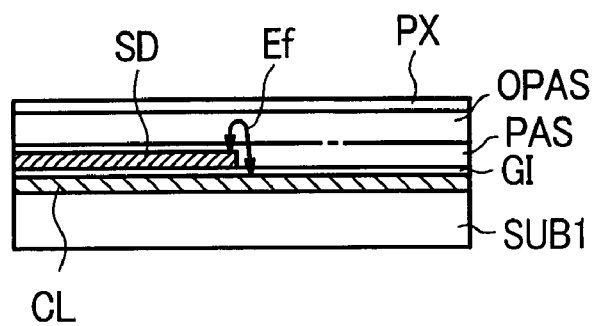

As seen in FIG. 9A and FIG. 10A, on an inner surface of the unit pixel formed on a first substrate SUB1, a plurality of scanning signal lines GL extend in the X direction and are arranged in parallel in the Y direction; a plurality of data signal lines DL extend in the Y direction and are arranged in parallel in the X direction; common signal lines CL are disposed close to the scanning signal lines GL and extend in the X direction, while being arranged in parallel in the Y direction; a plurality of thin film transistors TFT are arranged at intersecting portions of the scanning signal lines GL and the data signal lines DL; pixel electrodes PX are provided, which are driven by the thin film transistors TFT; and common electrodes CT are connected to the common signal line CL and are arranged with respect to the pixel electrodes PX such that the common electrode CT is arranged close to the pixel electrode PX in the X direction. Thus, the unit pixel is formed in a region surrounded by the scanning signal lines GL and the data signal lines DL.

The pixel electrode PX is arranged in a superposed manner over the common signal line CL by way of an insulation layer (an inorganic insulation layer PAS and an organic insulation layer OPAS) and is connected to a source electrode SD of the thin film transistor TFT via a through hole SH, which penetrates the insulation layer (the inorganic insulation layer PAS and the organic insulation layer OPAS). Further, a portion of the pixel electrode PX includes an enlarged portion PXE bridges strides over the common signal line CL from the inside of the unit pixel.

The common electrodes CT are formed such that they extend in the inside of the unit pixel covering the common signal line CL, except for a portion along the enlarged portion PXE of the pixel electrode PX, and, hence, an electric field between the common signal line CL and the pixel electrode PX can be blocked. The enlarged portion PXE of the pixel electrode PX has two sides along the X direction of the unit pixel and two sides along the Y direction. The unit pixel side of the two sides along the X direction is positioned inside a unit-pixel-side edge (side) of the common signal line CL, while the side of two sides opposite to the unit pixel PX is positioned outside the edge of the common signal line CL opposite to the unit pixel and outside the edge of the enlarged portion PXE of the pixel electrode PX opposite to the unit pixel.

A side of the source electrode SD of the thin film transistor TFT opposite to the unit pixel extends in the X direction close to the thin film transistor TFT to form one side of an extending portion SDE, while another side of the source electrode SD at the unit pixel side extends in the X direction parallel to one side of the extending portion SDE at the side opposite to the unit pixel from another of the two sides in the Y direction close to the thin film transistor TFT. Then, assuming that the distance between another side of the extending portion SDE and the edge of the common signal line CL opposite to the unit pixel PX is "a" and the distance between the side opposite to the unit pixel PX of another two sides of the source electrode SD and the neighboring common electrode in the X direction is "b", these distances are set as a≧0 and b≧0.

Accordingly, as shown in FIG. 10B, a portion where a fringe electric field Ef, which constitutes a strong electric field formed between the source electrode SD and the common signal line CL, can be completely blocked by the pixel electrode PX, and, hence, switching of liquid crystal molecules without regard to the normal switching operation of the unit pixel can be further suppressed, whereby no irregularities are generated with respect to the transmitting light (or reflection light) of the liquid crystal layer, whereby a high-quality image display can be obtained.

Figure 11A:
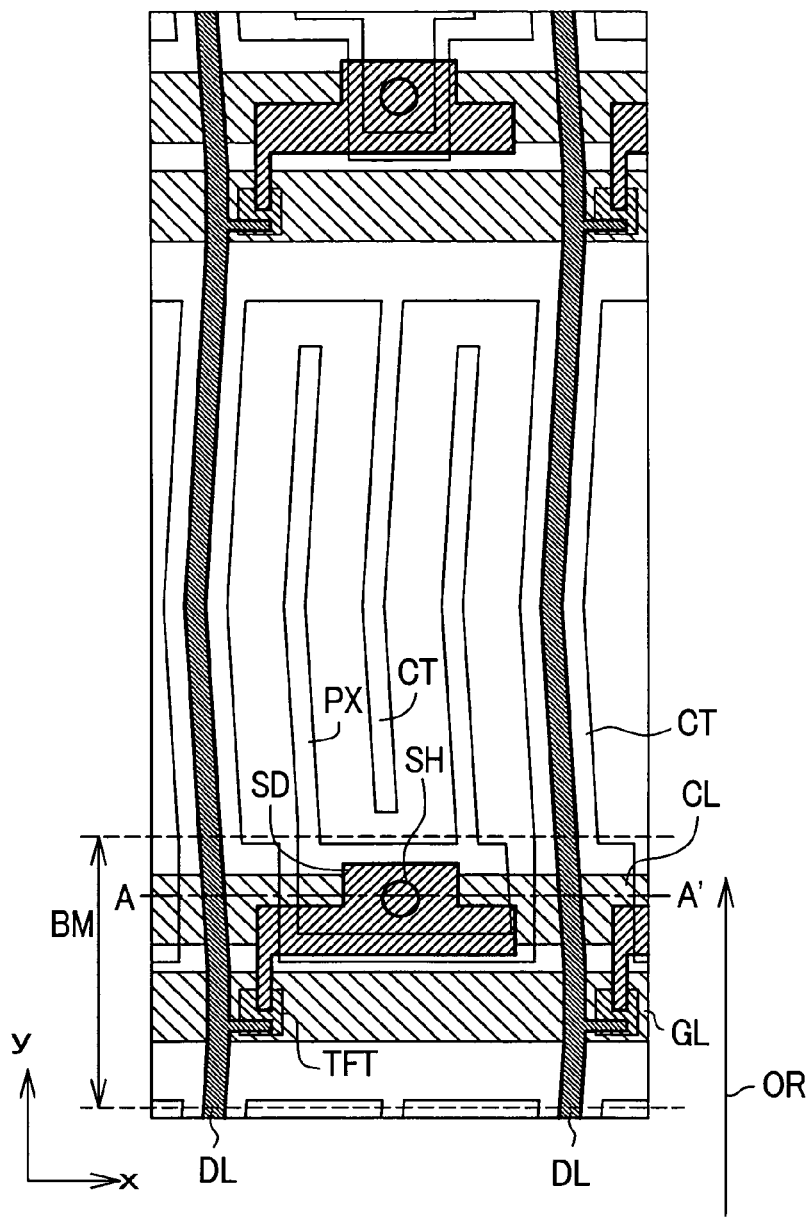
FIG. 11A is a plan view and FIG. 11B is a sectional view taken along line A-A' in FIG. 11A, showing the vicinity of a unit pixel in a sixth embodiment of a liquid crystal display device according to the present invention.
Figure 11B:
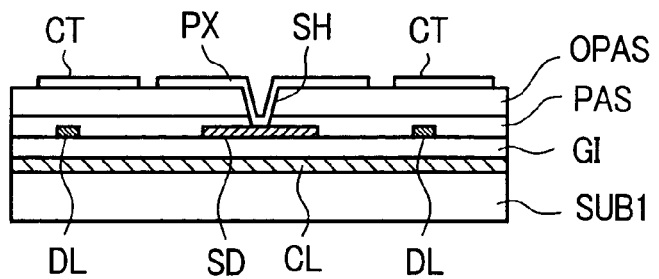

FIG. 11A shows the vicinity of a unit pixel in a sixth embodiment of a liquid crystal display device according to the present invention, and FIG. 11B is a cross sectional view taken along a line A-A' in FIG. 11A. Further, FIG. 12A shows the detailed structure in the vicinity of the thin film transistor TFT in FIG. 11A.

Figure 12:
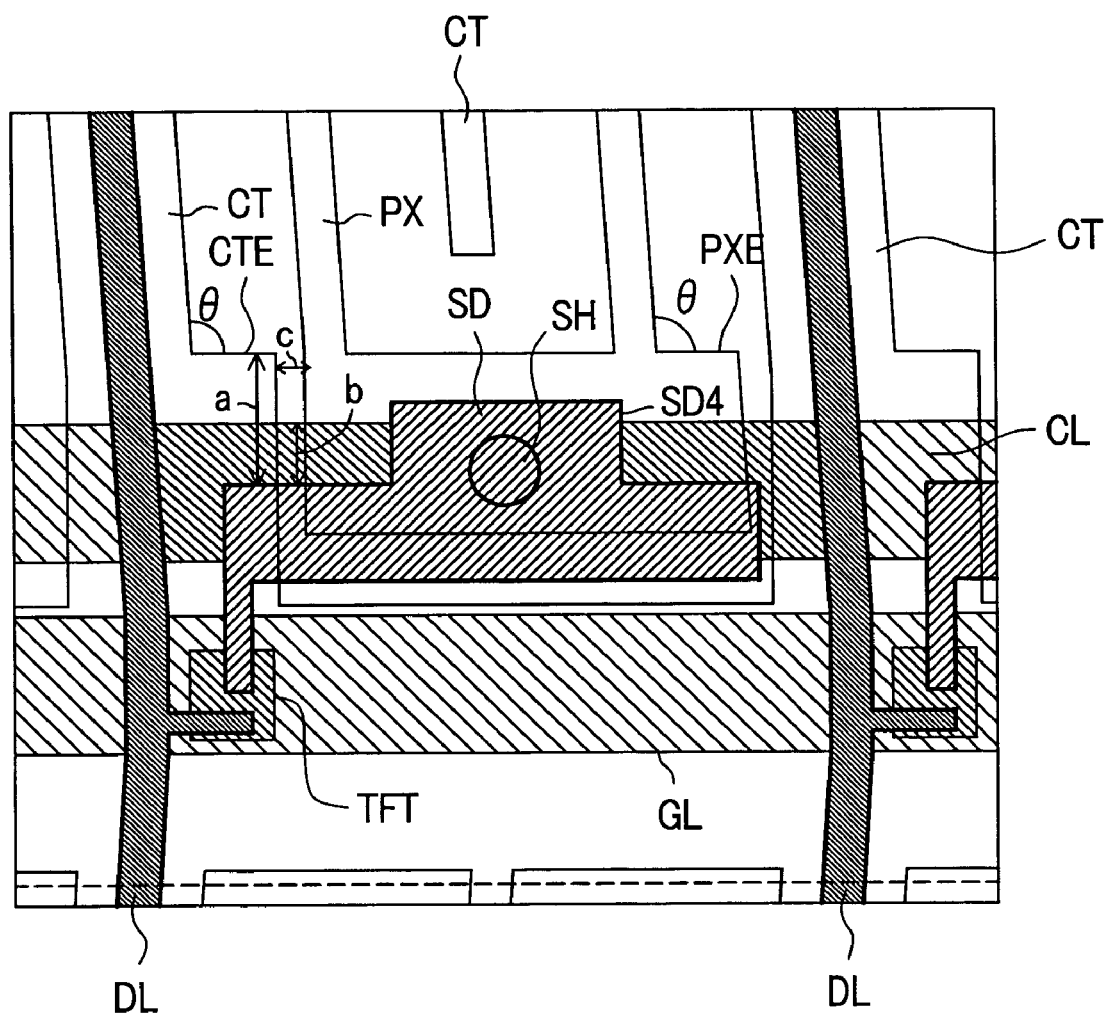
FIG. 12 is a plan view showing the detailed structure in the vicinity of the thin film transistor TFT in FIG. 11A.

As seen in FIG. 11A and FIG. 12A, on an inner surface of the unit pixel formed on a first substrate SUB1, a plurality of scanning signal lines GL extend in the X direction and are arranged in parallel in the Y direction; a plurality of data signal lines DL extend in the Y direction and are arranged in parallel in the X direction; common signal lines CL are disposed close to the scanning signal lines GL and extend in the X direction, while being arranged in parallel in the Y direction, a plurality of thin film transistors TFT are arranged at intersecting portions of the scanning signal lines GL and the data signal lines DL; pixel electrodes PX are provided, which are driven by the thin film transistors TFT; and common electrodes CT are connected to the common signal line CL and are arranged with respect to the pixel electrodes PX such that the common electrode CT is arranged close to the pixel electrode PX in the X direction. Thus, the unit pixel is formed in a region surrounded by the scanning signal lines GL and the data signal lines DL.

The pixel electrode PX is arranged in a superposed manner over the common signal line CL by way of an insulation layer (an inorganic insulation layer PAS and an organic insulation layer OPAS) and is connected to a source electrode SD of the thin film transistor TFT via a through hole SH, which penetrates the insulation layer (the inorganic insulation layer PAS and the organic insulation layer OPAS).

Further, a portion of the pixel electrode PX includes an approximately rectangular enlarged portion PXE which bridges over the common signal line CL from the inside of the unit pixel, while the source electrode SD includes a projecting portion SD4 which projects toward the unit pixel side at a portion which is covered with the enlarged portion PXE of the pixel electrode PX and projects toward the unit pixel side in a step-like manner beyond the common signal line.

The common electrode CT is formed such that it extends (overhangs) in the inside of the unit pixel, while covering the common signal line CL, except for a portion of the common signal line CL, along the enlarged portion PXE of the pixel electrode PX so as to block an electric field between the common signal line CL and the pixel electrode PX. At the same time, the common electrode CT includes common electrode enlarged portions CTE, which are enlarged to cover the common signal lines CL corresponding to the enlarged portion PXE of the pixel electrode PX at portions of the thin film transistor TFT side, while having sides which extend at an angle θ in the X direction with respect to the Y direction and sides which extend in the Y direction. Here, an angle at which the pixel electrode PX in the unit pixel rises is also set to θ.

The enlarged portions PXE of the pixel electrode PX include two sides along the X direction of the unit pixel and two other sides which extend in the Y direction of the unit pixel, wherein the unit pixel side of the two sides along the X direction is positioned more inside of the unit pixel than the common signal line CL and the other side of the two sides opposite to the unit pixel is positioned more inside than an edge the common signal line CL opposite to the unit pixel.

Here, by setting the angle θ to 90 °≦θ<180°, the pixel electrode PX and the common electrode CT are enlarged. Further, the relationship between the distance "a" between the side of the common electrode enlarged portion CTE which extends in the X direction and the step-like edge extending along the first direction, the distance "b" between the unit-pixel-side edge of the common signal line CL and the edge along the X direction of the projecting portion SD4 of the source electrode SD which projects in a step-like manner, and the distance "c" between the pixel electrode PX and the edge in the Y direction of the common electrode enlarged portion CTE is set to a>b, and is preferably set to (a−b)>c. Due to such a constitution, an electric field from the common signal line CL can be surely blocked, and, hence, the image retention areas are reduced, whereby the effective numerical aperture can be increased.

Figure 14A:
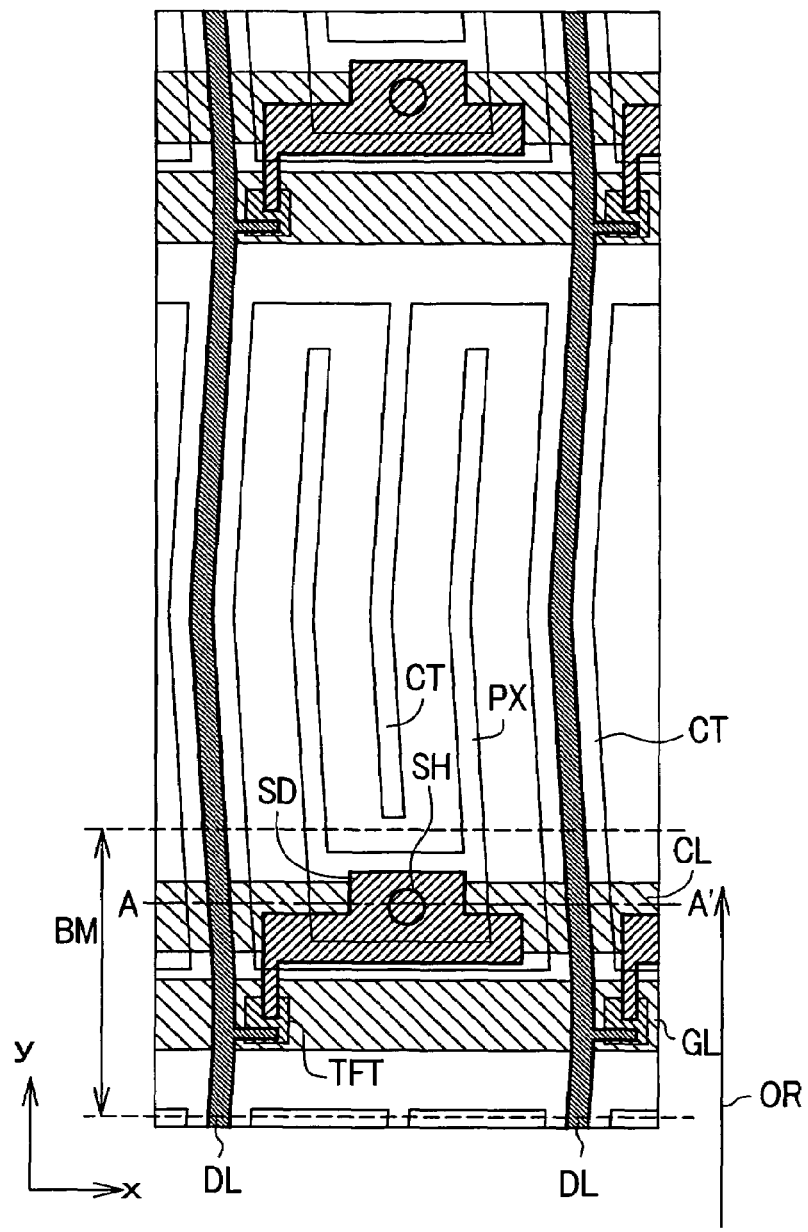
FIG. 14A is a plan view and FIG. 14B is a sectional view taken along line A-A' in FIG. 14A, showing the vicinity of one pixel of a liquid crystal display device which employs the IPS method.
Figure 14B:
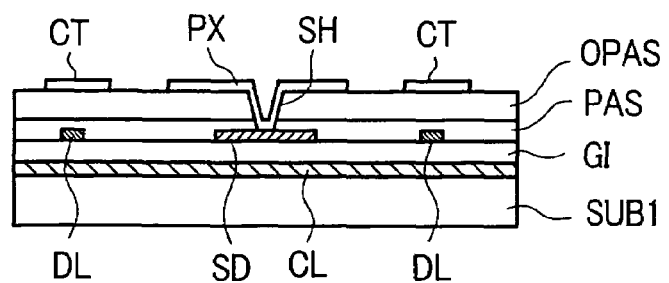
Figure 15A:
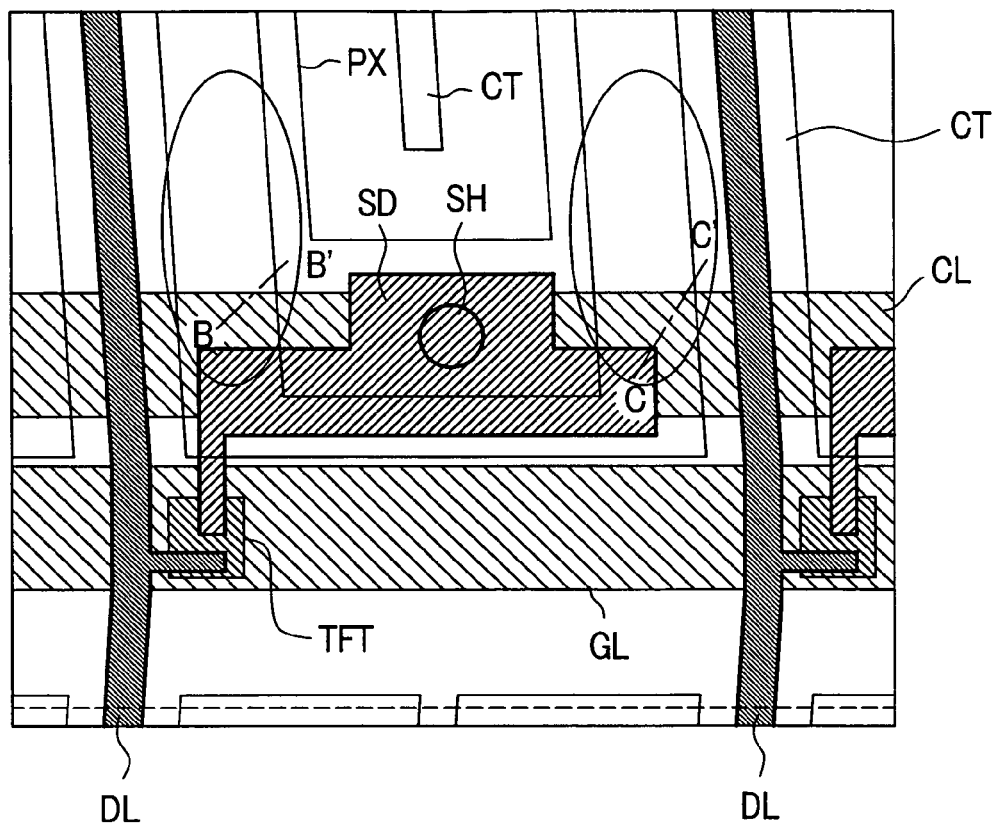
FIG. 15A is a plan view and FIGS. 15B and 15C are sectional views taken alone lines B-B' and C-C', respectively, in FIG. 15A, showing the detailed structure in the vicinity of the thin film transistor TFT in FIG. 14A.
Figure 15B:
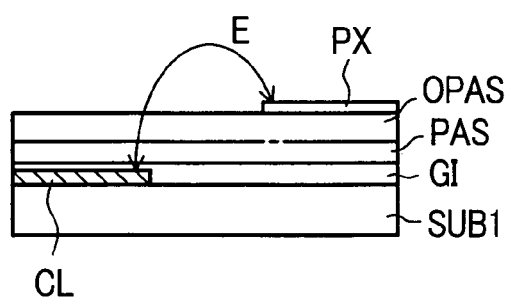
Figure 15C:
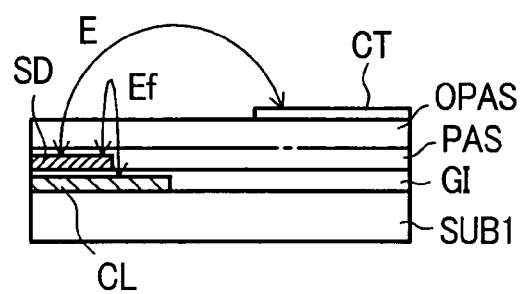

Here, in the above-mentioned respective embodiments, by setting the distance between the pixel electrode PX and the source electrode SD in FIG. 1A to be smaller than the distance between the pixel electrode PX and the common electrode CT, which are arranged to close each other, for example, a DC component which remains between the electrodes can be reduced; and, hence, the image retention can be suppressed, and, at the same time, the effective numerical aperture is enhanced. Here, as shown in FIG. 14A, by forming a black matrix BM such that the black matrix BM covers the longitudinal end portions of the pixel electrodes PX and the common electrodes CT inside of the unit pixel, a degradation of image quality attributed to image retention can be further suppressed.

Further, in the above-mentioned respective embodiments, by further arranging the common signal lines CL along both sides of the scanning signal line GL, it is possible to more effectively block the leaking of the electric field from the scanning signal line GL. Here, the end portions of the common electrodes CT are formed such that the end portions are retracted from the common electrodes CT inside of the unit pixel.

Figure 13:
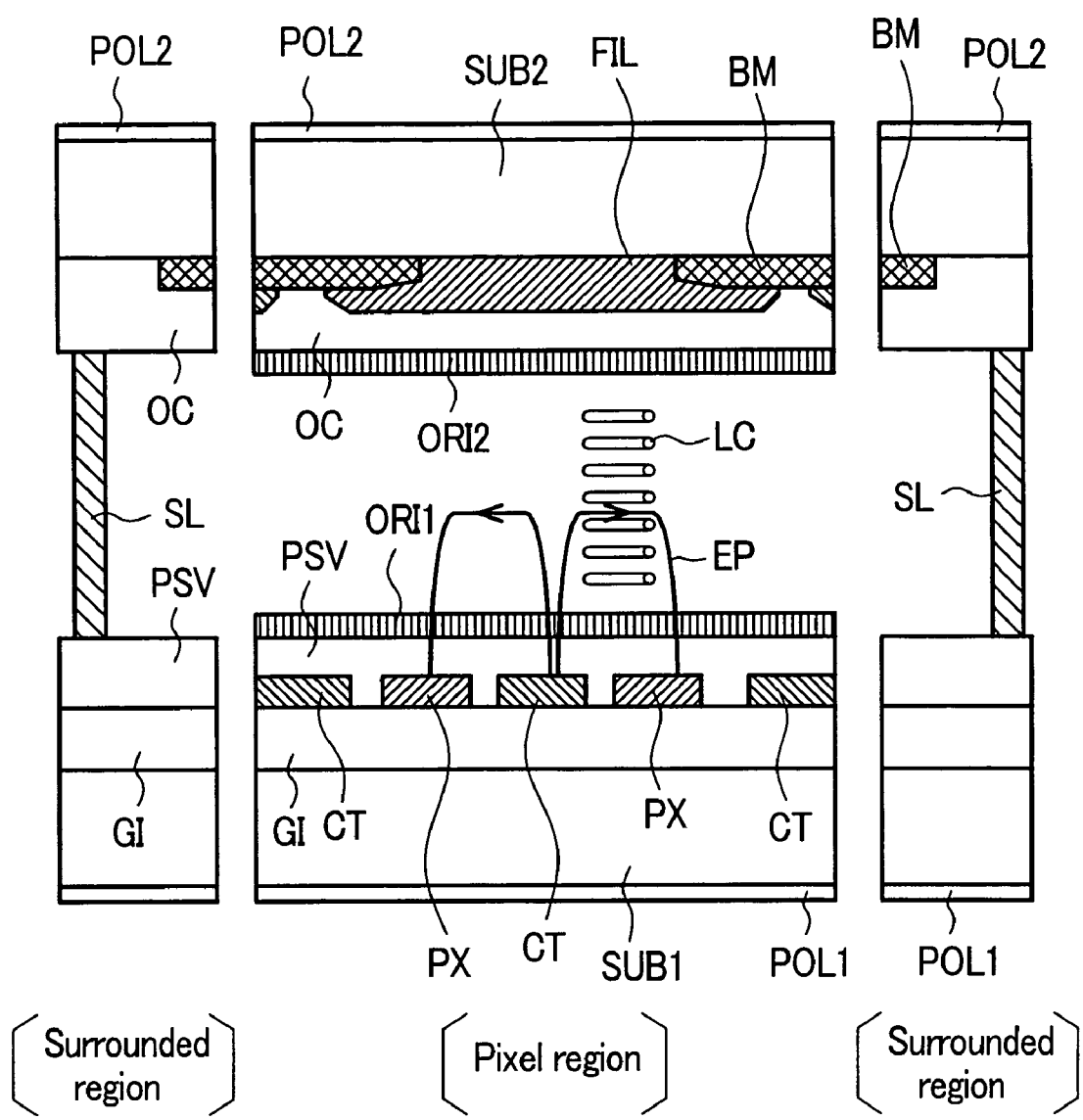
FIG. 13 is a diagram showing an example of a unit pixel portion and a peripheral portion of the liquid crystal display device of the present invention.

FIG. 13 is a schematic cross-sectional view showing one example of the unit pixel portion and the peripheral portion of the liquid crystal display device of the present invention. In the drawing, SUB1 indicates the first substrate which has been identified in conjunction with the respective embodiments. A first orientation film ORI1 is applied to an uppermost layer on the first substrate SUB1, which is brought into contact with the liquid crystal layer LC, and rubbing treatment is applied to the first orientation film. Then, a first polarizer POL1 is formed on an outer surface of the substrate SUB2. Here, the same reference symbols are used to identify identical functional portions in the respective embodiments, wherein PSV indicates a protective film and the constitution of the first substrate SUB1 is simplified.

Further, SUB2 indicates the second substrate, which constitutes the counter substrate, wherein the second substrate SUB2 includes color filters CF, which are defined by the black matrix BM, and an overcoat layer OC, which is formed above the color filters CF. Further, a second orientation film ORl2, which is brought into contact with the liquid crystal layer LC, is applied to the overcoat layer OC, and rubbing treatment is applied to the second orientation film ORl2. A second polarizer POL2 is mounted on an outer surface (a viewing side) of the second substrate SUB2. A sealing material SL seals between peripheral portions of the first substrate SUB1 and the second substrate SUB2.

The electric field EP which effects switching of the unit pixel (turning on/off of the unit pixel) is formed between the pixel electrode PX and the common electrode CT in the direction parallel to the respective substrate surfaces.

As has been explained heretofore, according to the present invention, the generation of an undesired electric field between the common signal lines and the pixel electrodes and the common electrodes in the periphery of the unit pixel, particularly in the vicinity of the thin film transistor, can be suppressed, and, hence, the occurrence of image retention can be reduced, whereby it is possible to provide a liquid crystal display device which is capable of displaying high quality images.

What is claimed is:

1. A liquid crystal display device comprising first and second substrates, a liquid crystal layer interposed between the first and the second substrates, a plurality of scanning signal lines and a plurality of data signal lines which are formed on the first substrate, and common signal lines which are arranged close to the scanning signal lines, wherein
   each unit pixel which is formed as a region surrounded by the scanning signal lines and the data signal lines includes a pixel electrode to which signals of the data signal line are electrically supplied through a thin film transistor and a common electrode which is electrically connected with the common signal line,
   wherein the common electrode extends in a direction of elongation of the data signal lines and includes an extension portion to be superposed on the common signal line by way of an insulation layer,
   wherein a width of the extension portion is wider than a width of the common electrode of a portion which is not overlapped with the common signal line and the scanning signal line,
   wherein the pixel electrode is electrically connected with a source electrode of the thin film transistor via a through hole which penetrates the insulation layer,
   wherein a portion of the pixel electrode includes a connecting portion which is elongated in a direction in parallel with a direction of elongation of the common signal line, and a portion of the connecting portion of the pixel electrode is formed to overlap with the common signal line,
   wherein the extension portion of the common electrode and the elongated connecting portion of the pixel electrode have overlapping portions with the common signal line and extend in the same direction with respect to the extending direction of the scanning signal line, and
   wherein, assuming a distance between an end portion of the extension portion of the common electrode and an end portion of the source electrode on the common signal line as "a", a distance between an end portion of the source electrode above the common signal line and an end portion of the common signal line as "b", and a distance between the extension portion of the common electrode and the elongated connecting portion of the pixel electrode on the common signal line as "c", the relationship (a−b)>c is established.

2. A liquid crystal display device according to claim 1, wherein an angle θ which is made by the common electrode and the extension portion of the common electrode is set to $90° \leq \theta < 180°$.

3. A liquid crystal display device according to claim 1, wherein an angle θ which is made by the pixel electrode and the overlapping portion of the pixel electrode is set to $90° \leq \theta < 180°$.

4. A liquid crystal display device according to claim 1, wherein the angle which is made by the pixel electrode and the overlapping portion of the pixel electrode is substantially equal to the angle which is made by the common electrode and the extension portion of the common electrode.

5. A liquid crystal display device according to claim 1, wherein the source electrode is longer than the elongated connecting portion of the pixel electrode in a direction extending in parallel with the scanning signal line, and the source electrode is formed over a part of the extension portion of the common electrode and a part of the common signal line.

* * * * *